United States Patent [19]
Knox et al.

[11] Patent Number: 5,443,902
[45] Date of Patent: Aug. 22, 1995

[54] POSTFORMING DECORATIVE LAMINATES

[75] Inventors: David E. Knox, Goose Creek; J. Donato Fortin, Charleston, both of S.C.; Harold L. Hintz, Mount Kisco, N.Y.

[73] Assignee: Westvaco Corporation, New York, N.Y.

[21] Appl. No.: 188,718

[22] Filed: Jan. 31, 1994

[51] Int. Cl.6 .............................................. B32B 29/00
[52] U.S. Cl. .................................... 428/340; 428/503; 428/511; 428/530; 428/534; 428/535; 428/537.5
[58] Field of Search ............... 428/219, 297, 340, 369, 428/534, 535, 536, 537.5, 503, 511, 530; 162/9

[56] References Cited

U.S. PATENT DOCUMENTS 4,431,479 2/1984 Barbe et al. .............................. 162/9

OTHER PUBLICATIONS

TAPPI, vol. 60, No. 4 (1977) pp. 114–117, "Elastic modulus of single wood pulp fibers", D. H. Page et al.
TAPPI, vol. 62, No. 9 (1979), pp. 99–102, "The elastic modulus of paper", D. H. Page et al.
TAPPI, vol. 63, No. 6 (1980), pp. 113–116, "The elastic modulus of paper", D. H. Page et al.

Primary Examiner—Patrick J. Ryan
Assistant Examiner—Marie R. Macholl
Attorney, Agent, or Firm—Terry B. McDaniel; Daniel B. Reece, IV; Richard L. Schmalz

[57] ABSTRACT

Improvements in the construction of postformable laminates are disclosed by the provision of a single high basis weight, high coarseness, high kappa number sheet formed predominantly of softwood pulp, preferably southern loblolly pine, which pulp has been treated in a mechanical device that effectively imparts kinking and curling to the individual pulp fibers. The sheet is intended as a replacement for the highly extensible sheet(s) currently located on the back of the laminate farthest away from the core.

20 Claims, 1 Drawing Sheet

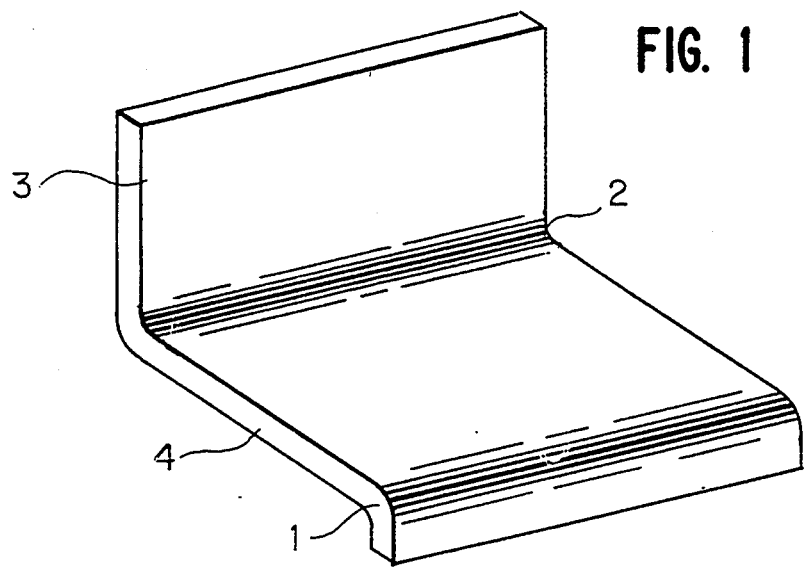
FIG. 1
FIG. 2
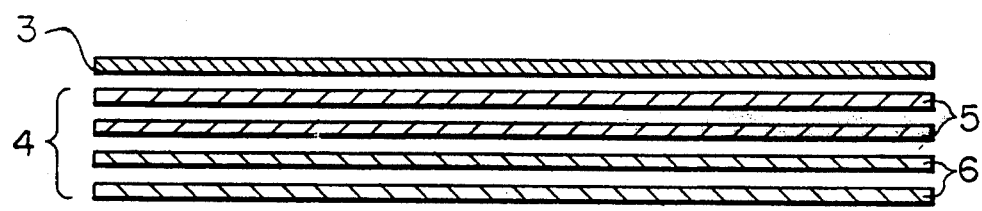
FIG. 3
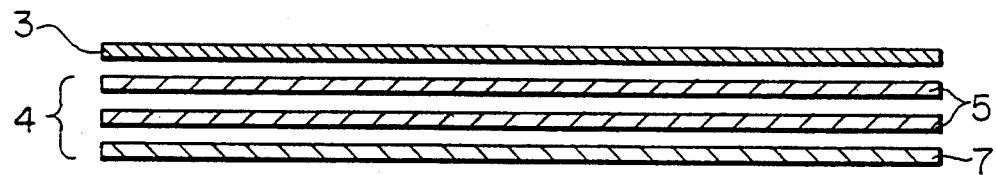

POSTFORMING DECORATIVE LAMINATES

BACKGROUND OF THE INVENTION

1. Field of the Invention

The present invention relates to new and useful improvements in manufactured paper and, more directly, relates to the provision of resin absorbent papers for the manufacture of high and low pressure fiber reinforced plastic laminates with improved postforming characteristics.

2. Description of the Prior Art

Postforming laminates are laminates that, after initial curing in a press, can be reheated along an axis and bent to give a material that has smooth, round, undamaged surfaces in either the forward or the backward direction. Such bends are depicted in FIG. 1. Forward bend 1 (sometimes called a "bullnose bend"), where the decorative side (or layer) 3 of the laminate is in tension, is generally a large radius bend exhibiting a radius from $\frac{1}{4}$ inch to $\frac{1}{2}$ inch. Tight bends with small radii may lead to damage in the laminate that can appear upon forming or appear at a later time in use and give failures that would be correctable only at great expense. Attempts to bend the decorative side in tension around a very tight radius (e.g., 1/16 inch to 3/16 inch) generally are unsuccessful due to the relatively high modulus with low elongation at break of the decorative layer. In general, forward bends of laminates are done at larger radii.

In contrast, a backward bend 2 of a laminate, where the decorative side 3 of the laminate is in compression and the core side 4 (shown in FIGS. 2 and 3 to be comprised of internal core sheets 5 covered with one or more postforming sheets 6 or 7, respectively) is in tension, generally is postformed to much tighter radii. This is due to the fact that the core side 4 of the laminate, which is impregnated with phenol/formaldehyde resin, can, by using appropriate paper or resin modifications, be made to have a lower modulus with a higher elongation at break than the decorative side 3. Another reason for the tighter attainable radii is the fact that the outer (tension) layer of the core side 4 can be modified to give a laminate that is better able to tolerate tensile strains imposed on it during bending. Such modifications of the decorative side 3 are not possible due to appearance and physical property requirements. Summarizing, decorative postforming laminates must be able to be bent with either the decorative or the core side in both tension and compression without affecting the appearance of the decorative surface.

A number of approaches have been taken to improve the performance of decorative postforming laminate bends. The prior art comprises various modifications to improve the bending ability of the decorative laminates in the forward direction. Improvements in the forward bends can be made by changing the furnish of the paper. For example, U.S. Pat. No. 3,327,084 teaches the use of low coarseness (thin and long) fibers as being superior to the use of thicker, high-coarseness fibers. Improvements in crazing, which is the undesirable tendency of the laminate to have cracking on the surface, were noted with the lower coarseness fibers. Specifically, high coarseness fibers such as southern loblolly pine were listed as being poor for postforming bends. In addition, the use of low denier synthetic fibers such as nylon and acrylic fibers was found to give improvements in crazing when used at levels of between 35% and 100% in the paper. Although this technology appears viable, the use of low coarseness natural fibers generally limits the papermaker to juvenile trees or slow-growing northern species, and synthetic fibers are considerably more expensive than wood fibers.

A second means of adding postformability to a laminate, especially for bending in the forward (or, bullnose) direction, is to modify the melamine resin that is used to impregnate the decorative layer. A variety of modifications to the decorative layer have been described including the use of caprolactams (U.S. Pat. No. 2,584,177), glucosides (U.S. Pat. No. 2,773,788), carbamates (U.S. Pat. No. 2,937,966), mannatin (U.S. Pat. No. 3,194,723), epoxies (U.S. Pat. No. 4,046,937), and polyethyleneglycols (U.S. Pat. No. 4,405,690).

Several prior art references describe modifications to the phenolic resin in the core sheets to improve postforming characteristics. These modifications include the use of water/glycerol, as in Canadian Patera No. 778,750, to enhance the performance of forward bends by enabling the core to undergo greater compressive deformation, inducing less tensile strain in the decorative layer. In Canadian Patent No. 894,859, the use of glycols and fatty acid oils as coreactants for the phenolic resin is described. In all cases, however, the use of these materials was to improve the appearance of the forward bend.

Current commercial postforming laminates employ one or several lightweight sheets on the back of the laminate. This laminate construction is shown in FIG. 2 to be comprised of the decorative layer (or side) 3 and the core side 4. The lightweight postforming sheets 6 that are used on the back of this laminate are a multi-walled sack paper that generally is made from northern low coarseness softwood. That pulp is understood to be subjected to mild (low energy) high-consistency treatment (e.g. Frotapulper from Ingersoll-Rand) and, the web is dried in an unrestrained manner (Flakt drying). This Flakt drying process, which also allows free shrinkage in the cross-direction; gives high (6-7%) cross-directional (CD) stretch. This cross-directional stretch imparts the desirable bending characteristics to the laminate which is heated along a machine-direction (MD) axis and is bent in the cross-direction. It has been accepted that high CD stretch in a paper sheet is necessary for use in the postforming layer of a laminate.

Paper of this type is available in low basis weights of 75 lbs./3000 ft$^2$ from RePap Industries in LaPas, Alberta, Canada. The primary market for this paper is bag stock rather than laminates. Although this paper is known to give good bending characteristics to the laminate, it suffers from several deficiencies, including inherently poor treatability, due to sheet construction, low basis weight, and relatively high cost, due to air-drying techniques needed to induce CD stretch. For standard horizontal grade postforming laminates of about 0.037 inch thickness, the postforming sheets comprise about $\frac{1}{3}$ of the mass of the core of a laminate, and two 75 lbs./3000 ft$^2$ sheets must be used. Therefore, twice as many linear feet of paper must be treated, as compared to having a product which requires only one sheet of about 150 lbs./3000 ft$^2$. In addition, since the lighter weight papers are designed as extensible sheets, they tend to give poor dimensional stability to laminates. The use of multiple sheets with low basis-weight also requires additional collating costs in the layup of the laminate. Thus, the current commercial product results in relatively slow production rates and higher costs to the laminator.

An object of this invention, therefore, is to provide a sheet that overcomes many of the problems associated with highly extensible, light weight commercial products that currently are being employed. Specifically, it is an object of this invention to provide a high basis weight sheet that does not require high CD stretch and is easier to treat and less costly to produce and use than the lighter-weight products, while still providing excellent surfaces in both forward and backward bends.

BRIEF DESCRIPTION OF THE DRAWINGS

FIG. 1 shows the manner in which decorative postforming laminates must be able to be bent with either the decorative 3 or the core side 4 in both tension and compression.

FIG. 2 depicts a cross-section view of a postforming laminate of current construction with multiple lightweight (normally $<80$ lbs./3,000 ft$^2$) postforming sheets 6 on the back of the core side 4 of the laminate.

FIG. 3 shows, in cross-section, the construction of the laminates depicted in FIG. 1 and, in particular, the laminate construction wherein a single high basis-weight ($>80$ to about. 185 lbs./3,000 ft$^2$) postforming sheet 7 has replaced the two sheets 6 of the conventional construction shown in FIG. 2.

SUMMARY OF THE INVENTION

The above-stated objects are achieved in this invention of a paper sheet that can be used for the production of laminates and which enables the laminates to be bent in both the forward and the backward direction as shown in FIG. 1 with little or no evidence of laminate failure or crazing. Of particular interest is the appearance (in FIG. 1) of the backbend 2 with this sheet since it enables the laminate to be bent to a very tight radius of as low as $\frac{1}{8}$" without evidence of cracking or crazing. The construction of the laminates in this invention is shown in FIG. 3 where a single high basis-weight sheet 7 has replaced the two sheets 6 as shown in FIG. 2. For the purposes of this invention, the special postforming sheet 7 is placed on the back of the laminate core side 4 farthest away from the decorative sheet. Also, it is possible to use a plurality of these postforming sheets 7 in the core side 4 in which case added benefits to bending are observed.

DESCRIPTION OF THE PREFERRED EMBODIMENT(S)

This invention describes new compositions for decorative postforming laminates. This invention also describes a process for the manufacture of a sheet that, when used in laminates having the new compositions, can be used to enhance the bending ability of decorative postforming laminates. In addition, the sheet described in this invention has improved (faster) treatability compared to lighter-weight products that are currently used.

The sheet that is the preferred embodiment of this invention consists of high coarseness, high kappa number, softwood pulp obtained predominantly from southern loblolly pine. Although other softwood or hardwood pulps of different kappa number and coarsenesses can be used without materially departing from this invention, the preferred embodiment of this invention is the use of high coarseness softwood. The softwood that is used in the preferred embodiment is treated in a device that, by the energy employed in its treatment, effectively imparts a large amount of curling and kinking to the fiber.

A number of kinking and curling devices are known and include Frotapulpers (Ingersoll-Rand), Chemifiners (Black-Clawson), Micar Mixers (Black-Clawson), and Pressafiners (Andritz Sprout-Bauer). The devices listed above, as well as other devices to induce curling and kinking of the wood fibers, may be used without departing from this invention. In the current invention, the means of adding improved postformability is the use of curled and kinked fibers, produced by treating pulp in a kinking and curling device such as one of those indicated above. This is different from current commercial products that employ unrestrained drying or other processes such as creping in order to achieve the desired effect of high CD stretch. The sheets that are the preferred embodiment of this invention have a cross-directional stretch of from about 1% to about 3%; whereas sheets with unrestrained drying have stretches in the cross-section of from 5% to 7%, and creped sheets can have CD stretch as high as 25%. The sheets that are the preferred embodiment of this invention also exhibit a lower machine direction:cross direction (MD/CD) tensile ratio than the current commercial product. It is well known to those skilled in the art that low MD/CD tensile ratios give better laminate dimensional stability. Although pulp for the current commercial product that is restrain dried is believed to be treated in a Frotapulper, the treatment does not impart sufficient mechanical action (or energy) to the pulp to allow for good postforming (see Examples 2 and 3 in the Table). Other high-consistency devices that give curled fibers such as high-pressure, high-consistency refiners also are known to those skilled in the art.

In this invention, pulp is treated in a device that imparts curl and kinking to the fiber. While we do not wish to be limited to any theory concerning why a significant amount of fiber curling and kinking gives enhanced postforming, it appears that the curling and kinking imparted to the fibers by this treatment, without increasing bulk stretch in the sheet, is a controlling factor in determining the quality of the bends in the postforming laminate. We have found that it is necessary to apply a sufficient amount of energy to the pulp in order to curl and kink a sufficient number of fibers to impart good bending characteristics to the laminates.

A description of the effects of fiber curling and kinking on paper modulus has been given by Page, et. al., in TAPPI, 60, #4, 1977, p. 114; TAPPI, 62, #9, 1979, 99; and TAPPI, 63, #6, 1980, 113 which teachings are incorporated herein by reference. Kinked and curled fibers have a lower modulus and higher elongation at break and are essentially zero-load bearing fibers. They act as springs which are able to be stretched prior to bearing load. These fibers inhibit crack propagation since stress transfer to these fibers results in restretching (or uncoiling) the fibers rather than in causing continued fiber and/or matrix rupture and damage to the laminate. Since there are many of these fibers, smaller stresses are developed during bending deformation and damage at the bend is minimized. This differs from the use of sheets that have been air-dried and have large extensibilities at the bulk paper level. Sheets with a sufficient number and degree of curled and kinked fibers will show a low paper modulus without necessarily having high degrees Of paper stretch.

The strain at break and elastic moduli of sheets made from fibers treated at various energy inputs to induce curling and kinking are shown in the following Table. Interestingly, treatment of high coarseness fibers such as loblolly pine gives excellent postformability and essentially no evidence of laminate damage, as evidenced by crazing at the site of the bend. This invention, therefore, enables the use of these more common fibers which are produced in temperate climates with longer growing seasons. Therefore, the preferred embodiment of this invention is the use of a predominantly softwood based furnish ($\geq 70\%$ and, preferably, $\geq 80\%$) in the outermost layer of the laminate although other laminate constructions are possible without departing from this invention.

For purposes of evaluation, the visual appearance of the laminate bends was evaluated on a scale of five ("5") to one ("1") with a "5" rating being the best and a "1" rating being the worst. The scale used is as indicated below:

5 = excellent appearance (no sign of crazing);
4 = very good appearance (only minor crazing lines appear);
3 = fair appearance (moderate degree of crazing but no cracking);
2 = poor appearance (severe crazing and some obvious cracking); and
1 = very poor appearance (obvious through cracking).

EXAMPLE 1

This example is for comparison purposes. A sheet consisting of a predominantly softwood ($\geq 80\%$) furnish was fabricated at a basis weight of from 150 lbs./3000 ft$^2$ to 160 lbs./3000 ft$^2$ using a standard 12"$\times$12" handsheet mold. The sheet was wet-pressed in a static Williams press at 135 lbs./in$^2$ for 15 minutes. The sheet was allowed to air-dry overnight with restraining rings. Subsequent to this, the sheet was dry calendered at 300 pli. The dried sheet was treated with a phenolic resin to obtain between 24% and 37% resin content on a bone dry basis. The preferred amount of resin is between 27% and 30% on a bone dry basis. This sheet was put into a laminate construction shown in FIG. 3 with a single softwood-based sheet at the outermost section of the core. The other core sheets consisted of two 156 lbs./3000 ft$^2$ predominantly hardwood based sheets. A decorative layer also is used in the laminate construction. A laminate constructed in this fashion was pressed in a heated hydraulic press at from about 1000 psi to about 1200 psi for approximately 50 minutes to a maximum temperature of 265° F. The laminates next were removed from the press and cut into three-inch strips in the cross direction of the laminate. These strips were marked with wax that melts at 325° F. and heated over a radiant heater until the wax melted (about 30–35 seconds). The laminates then were bent with the core side in tension to a radius of $\frac{1}{8}$", and the backs of the laminates were inspected for the appearance of crazing or other defects. Laminates made with a sheet containing only a softwood furnish showed signs of crazing that indicated moderate signs of laminate damage; these laminates were given a "1" or a "2" rating on the scale indicated above.

EXAMPLE 2

This example is for comparative purposes. Two sheets of lightweight bagstock (75 lbs./3000 ft$^2$) from RePap Industries, LaPas, Alberta, Canada were treated to a resin content of between 27% and 30% using the same phenolic resin described in Example 1. Two of these sheets were used as the back core sheets of a laminate as a substitute for the higher basis weight paper described in Example 1. When a laminate treated in a similar fashion as Example 1 was bent to a $\frac{1}{8}$" radius, the laminate showed no signs of crazing and was generally rated as a "4" or "5" on the scale indicated above. (See the Table.)

EXAMPLE 3

This example is for comparative purposes. The lightweight bagstock sheet paper described in Example 2 was rewet by soaking the paper in water for several minutes after which the paper was dried in restraining rings overnight. This dried paper was treated with phenolic resin and used in laminates as described in Example 2. When laminates containing this paper were bent, the backs of the laminates were largely crazed and showed significant signs of damage. These laminates generally obtained a "1" or a "2" rating. This comparative example demonstrates that when the RePap Sheet is dried under restraint (preventing cross-direction shrinkage) it loses its cross-directional stretch, resulting in loss of performance; indicating that unrestrained drying is a necessary condition for performance of this sheet. (See the Table.) Yet, the postforming sheets which are the subject of this invention are restrain dried.

EXAMPLES 4–12

These examples demonstrate how this invention may be practiced with the treatment of both unrefined and refined softwood pulp. In these examples fiber treatment was conducted in an Andritz Sprout-Bauer Pressafiner device. Also, comparison data is provided for the current commercial sheet. Results are indicated in the following Table.

TABLE

| Example | Energy Input (Hp-Days/Ton) | Modulus of Sheet (kpsi) | Strain to Break of Sheet (%) | Laminate Bend Performance |
|---|---|---|---|---|
| Extensible Sheet from RePap Industries ||||
| 2 | — | 3.07 | 6.8 | 4 to 5 |
| 3 (Rewetted and Restrained Dried) | — | 3.13 | 3.7 | 1 |
| Invention Unrefined Pulps ||||
| 4 | 0.89 | 3.69 | 2.2 | 1 to 2 |
| 5 | 1.79 | 3.11 | 2.3 | 1 to 2 |
| 6 | 1.06 | 3.34 | 2.9 | 1 to 2 |
| 7 | 3.07 | 2.27 | 2.7 | 2 to 3 |
| 8 | 2.40 | 2.26 | 2.7 | 1 to 2 |
| 9 | 7.04 | 1.99 | 2.9 | 4 to 5 |
| 10 | 4.69 | 2.40 | 3.0 | 4 to 5 |
| 11 | 10.06 | 1.09 | 2.3 | 4.5 to 5 |
| Pulp Steamed to 140° F. to 170° F. Prior to Treatment ||||
| 12 | 2.35 | 1.44 | 2.1 | 4 to 5 |
| Invention Refined Pulps ||||
| 13 (pH = 7.7) | 3.2 | 2.16 | 2.6 | 4 to 5 |
| 14 (pH = 5.4) | 2.4 | 1.58 | 3.1 | 3 to 4 |

As the energy input to the pulp increases, the performance of the laminate bend is greatly improved. Laminate bend performance improves at above about 2 hp-days/ton and, based on achieving a rating of 4.5 to 5 at about 10 hp-days/ton, would be expected to achieve optimum performance at an energy input of about 15 hp-days/ton. When unrefined pulp is treated with the feed pulp at room temperature (50°–75° F.), improvements may not be recognized below about 3 hp-days/ton; and, preferably, an energy of at least about 4 hp-days/ton is employed. It is apparent also from Example No. 12 that pulp may be raised in temperature by steaming or other methods prior to treatment and that good laminate bending results can be obtained at the elevated treatment temperatures (preferably about 140°–170° F.) while still maintaining good laminate bending performance. In the case of steaming, the energy input to the pulp to obtain the desired positive effect is considerably less than when starting with a pulp at room temperature.

As evidenced by the comparative data in the Table, the decrease in sheet modulus to below about 2.5 kpsi (preferably 0.5–1.3 kpsi) gives sheets of improved laminate bend performance.

Examples 13 and 14 show that refined pulp at varying pH's may also be used in pulp treatments for the production of a postforming sheet. This evidences the options for flexible processing of the pulp.

While the invention has been particularly shown and described with reference to the preferred embodiments thereof, it will be understood by those skilled in the art that various alterations in form and detail may be made therein without departing from the spirit and scope of the invention.

What is claimed is:

1. An improved postformable laminate comprising a decorative layer, a core layer of saturable kraft, and a postforming sheet wherein the improvement comprises, as the postforming sheet, a sheet prepared from wood pulp and characterized by a basis weight of from about 80 lbs./3,000 ft$^2$ to about 185 lbs./3,000 ft$^2$, tensile modulus below about 2.5 kpsi, and cross directional stretch of from about 1% to about 3%, wherein said pulp is refined wood pulp subsequently subjected to a mechanical treatment at an energy input of from about 2 to about 15 hp-days/ton which imparts kinking and curling characteristics to individual pulp fibers.

2. The improved postformable laminate of claim 1 wherein the wood pulp is comprised of at least about 70% softwood pulp.

3. The improved postformable laminate of claim 1 wherein the sheet's basis weight is from about 145 lbs./3,000 ft$^2$ to about 160 lbs./3,000 ft$^2$.

4. The improved postformable laminate of claim 1 wherein the mechanical treatment energy input is from about 3 to about 15 hp-days/ton.

5. The improved postformable laminate of claim 4 wherein the mechanical treatment energy input is from about 4 to about 15 hp-days/ton.

6. The improved postformable laminate of claim 1 wherein the pulp is further characterized by a kappa number greater than 30.

7. The improved postformable laminate of claim 1 wherein the pulp is raised in temperature prior to the mechanical treatment.

8. The improved postformable laminate of claim 7 wherein the rise in temperature is produced by introducing steam into the pulp, 9. The improved postformable laminate of claim 1 wherein the sheet is characterized by a tensile modulus from about 0.5 to about 1.3 kpsi.

10. The improved postformable laminate of claim 1 wherein the pulp has been subjected to a multiple of the mechanical treatments.

11. An improved postformable laminate comprising a decorative layer, a core layer of saturable kraft, and a postforming sheet wherein the improvement comprises, as the postforming sheet, a sheet prepared from wood pulp and characterized by a basis weight of from about 80 lbs./3,000 ft$^2$ to about 185 lbs./3,000 ft$^2$, tensile modulus below about 2.5 kpsi, and cross directional stretch of from about 1% to about 3%, wherein said pulp is unrefined wood pulp which is subjected to a mechanical treatment at an energy input of from about 3 to about 15 hp-days/ton which imparts kinking and curling characteristics to individual pulp fibers.

12. The improved postformable laminate of claim 11 wherein the wood pulp is comprised of at least about 70% softwood pulp.

13. The improved postformable laminate of claim 11 wherein the sheet's basis weight is from about 145 lbs./3,000 ft$^2$ to about 160 lbs./3,000 ft$^2$.

14. The improved postformable laminate of claim 11 wherein the pulp is subjected to a disk refining treatment subsequent to the mechanical treatment.

15. The improved postformable laminate of claim 11 wherein the mechanical treatment energy input is from about 4 to about 15 hp-days/ton.

16. The improved postformable laminate of claim 11 wherein the pulp is further characterized by a kappa number greater than 30.

17. The improved postformable laminate of claim 11 wherein the pulp is raised in temperature prior to the mechanical treatment.

18. The improved postformable laminate of claim 17 wherein the rise in temperature is produced by introducing steam into the pulp.

19. The improved postformable laminate of claim 11 wherein the sheet is characterized by a tensile modulus of from about 0.5 to about 1.3 kpsi.

20. The improved postformable laminate of claim 11 wherein the pulp has been subjected to a multiple of the mechanical treatments.

* * * * *